United States Patent [19]

Yamashita

[11] Patent Number: 4,868,914

[45] Date of Patent: Sep. 19, 1989

[54] METHOD FOR CLEARING UNLOCKING KEY CODES IN AN ELECTRONIC LOCKING DEVICE

[75] Inventor: Toshihiko Yamashita, Osaka, Japan

[73] Assignee: Unisafe Limited, Hong Kong

[21] Appl. No.: 135,766

[22] Filed: Dec. 21, 1987

[51] Int. Cl.[4] .......................... E05B 47/00; H04Q 3/00

[52] U.S. Cl. .......................... 340/825.31; 340/825.3; 70/276; 70/278

[58] Field of Search .......................... 340/825.3, 825.31; 70/277, 278, 276; 235/382.5; 364/140, 141

[56] References Cited

U.S. PATENT DOCUMENTS

| | | | |
|---|---|---|---|
| 3,821,704 | 6/1974 | Sabsay | 340/825.31 |
| 3,906,447 | 9/1975 | Crafton | 340/825.31 |
| 4,207,555 | 10/1980 | Trombly . | |
| 4,411,144 | 10/1983 | Aydin . | |
| 4,511,946 | 4/1985 | McGahan | 340/825.31 |
| 4,519,228 | 5/1985 | Sornes | 70/278 |

FOREIGN PATENT DOCUMENTS

| | | |
|---|---|---|
| 1456138 | 8/1974 | United Kingdom . |
| 8002711 | 12/1980 | World Int. Prop. O. . |

*Primary Examiner*—Gerald L. Brigance

*Attorney, Agent, or Firm*—Townsend and Townsend

[57] ABSTRACT

A method for clearing unlocking key codes in an electronic locking device in which the unlocking circuit is arranged to be actuated when the code of a magnetic card read by the card reader agrees with an unlocking key code set in the memory, the method comprising using a first clearing card which will function only when the door associated with the locking device is open and a second clearing card which will function only when the door is closed, setting the codes of the first and second clearing cards in specified separate addresses in the memory in the code setting mode for setting the codes of the clearing cards in the processing unit (CPU) of the electronic locking device, determining whether the door is open or closed in the normal operation mode of the CPU, and clearing the unlocking key codes only when the code read by the card reader is identical to the code of the first clearing card set in the above-mentioned manner and the door is open, or when the code read by the card reader is identical to the code of the second clearing card set in the above-mentioned manner and the door is closed.

9 Claims, 3 Drawing Sheets

METHOD FOR CLEARING UNLOCKING KEY CODES IN AN ELECTRONIC LOCKING DEVICE

This invention relates to a method for clearing unlocking key codes from an electronic locking device.

BACKGROUND TO THE INVENTION

In comparison with mechanical locking devices, electronic locking devices, in which the unlocking circuit is arranged to be actuated when the code of a magnetic card read by the card reader agrees with an unlocking key code set in the memory, have large merits in security and are widely used in facilities where a large number of locking devices are required such as hotels.

Such electronic locking devices installed in guest rooms of hotels require alteration of the unlocking key code of a room whenever a guest changes. If such clearing of key codes could be effected by anyone at any time, the electronic locking devices would become useless.

It is, therefore, necessary to arrange the electronic locking device so that the unlocking codes are cleared only when certain conditions are met. To be more specific, when a card (hereinafter called a clearing card) storing a certain code is inserted into the card reader of the electronic locking device. In the context of this invention, the term "clearing of key codes" is to be construed as enabling the memory under specified conditions by cancelling the flag of the memory storing key codes.

The present invention was made in view of the aforementioned circumstance, and it is an objective of the invention to make the clearing of unlocking key codes easier while retaining security of normal operation.

BRIEF SUMMARY OF THE INVENTION

According to the invention there is provided a method for clearing unlocking key codes in an electronic locking device in which the unlocking circuit is arranged to be actuated when the code of a magnetic card read by the card reader agrees with an unlocking key code set in the memory set in the memory, the method comprising using a first clearing card which will function only when the door associated with the locking device is open and a second clearing card which will function only when the door is closed, setting the codes of the first and second clearing cards in specified separate addresses in the memory in the code setting mode for setting the codes of the clearing cards in the processing unit (CPU) of the electronic locking device, determining whether the door is open or closed in the normal operation mode of the CPU, and clearing the unlocking key codes only when the code read by the card reader is identical to the code of the first clearing card set in the above-mentioned manner and the door is open, or when the code read by the card reader is identical to the code of the second clearing card set in the above-mentioned manner and the door is closed.

One form of electronic locking device which can be unlocked in an emergency is described in European Patent Application No. 87304541.3 and reference is made to that Application for a full description.

BRIEF DESCRIPTION OF THE DRAWINGS

An example of one preferred embodiment of the unit for clearing unlocking key codes of an electronic locking device will now be described with reference to the accompanying drawings, which.

DESCRIPTION OF THE PREFERRED EMBODIMENT

Figure 1:
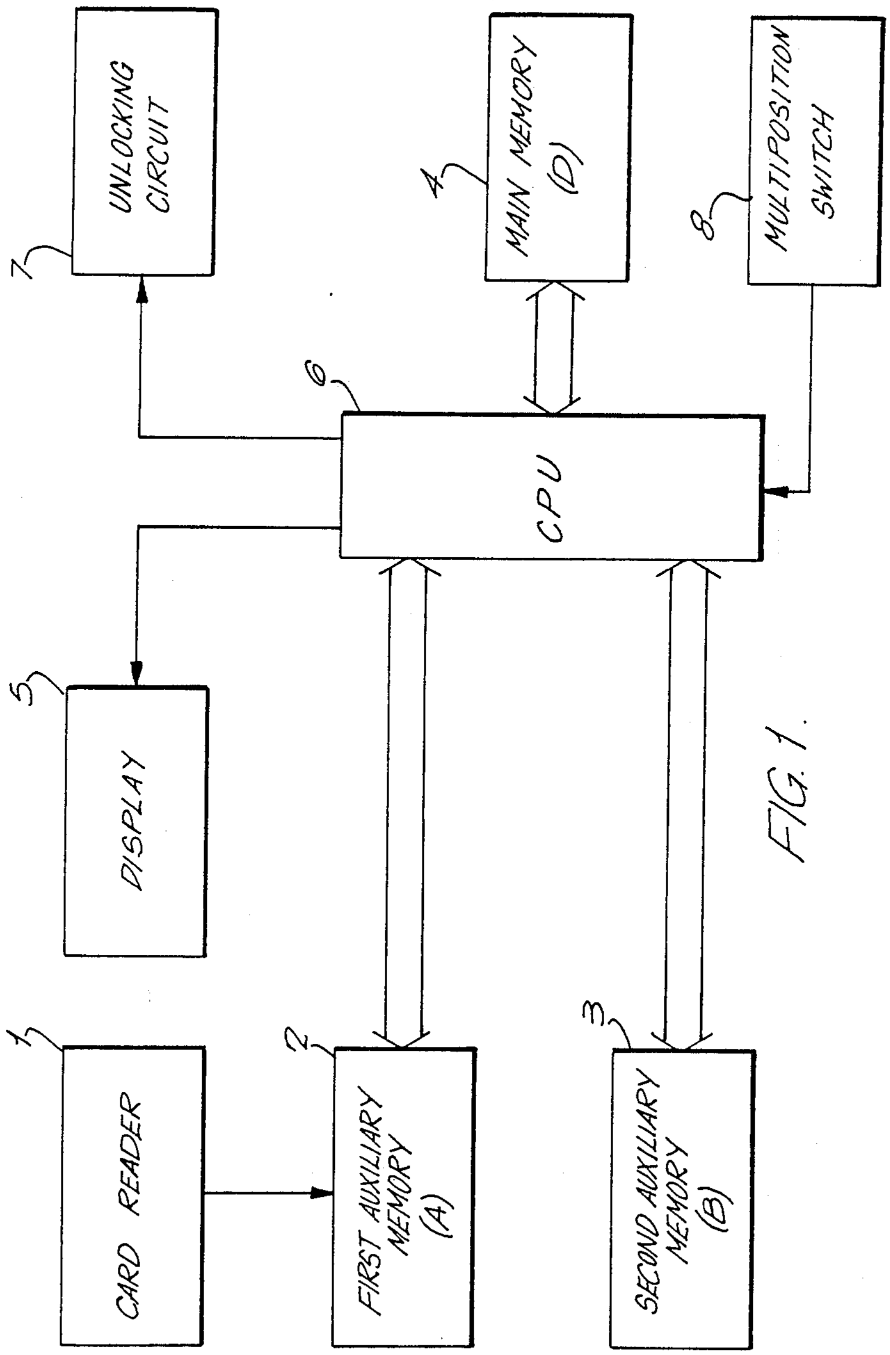
FIG. 1 is a block diagram of the electronic locking device used in one preferred embodiment of the present invention.

The method for clearing unlocking key codes in this preferred embodiment is used in, for instance, an electronic locking device for hotels, such as a personal safe for guests as used in a hotel room, and the configuration of such an electronic locking device is shown in FIG. 1.

Figure 2:
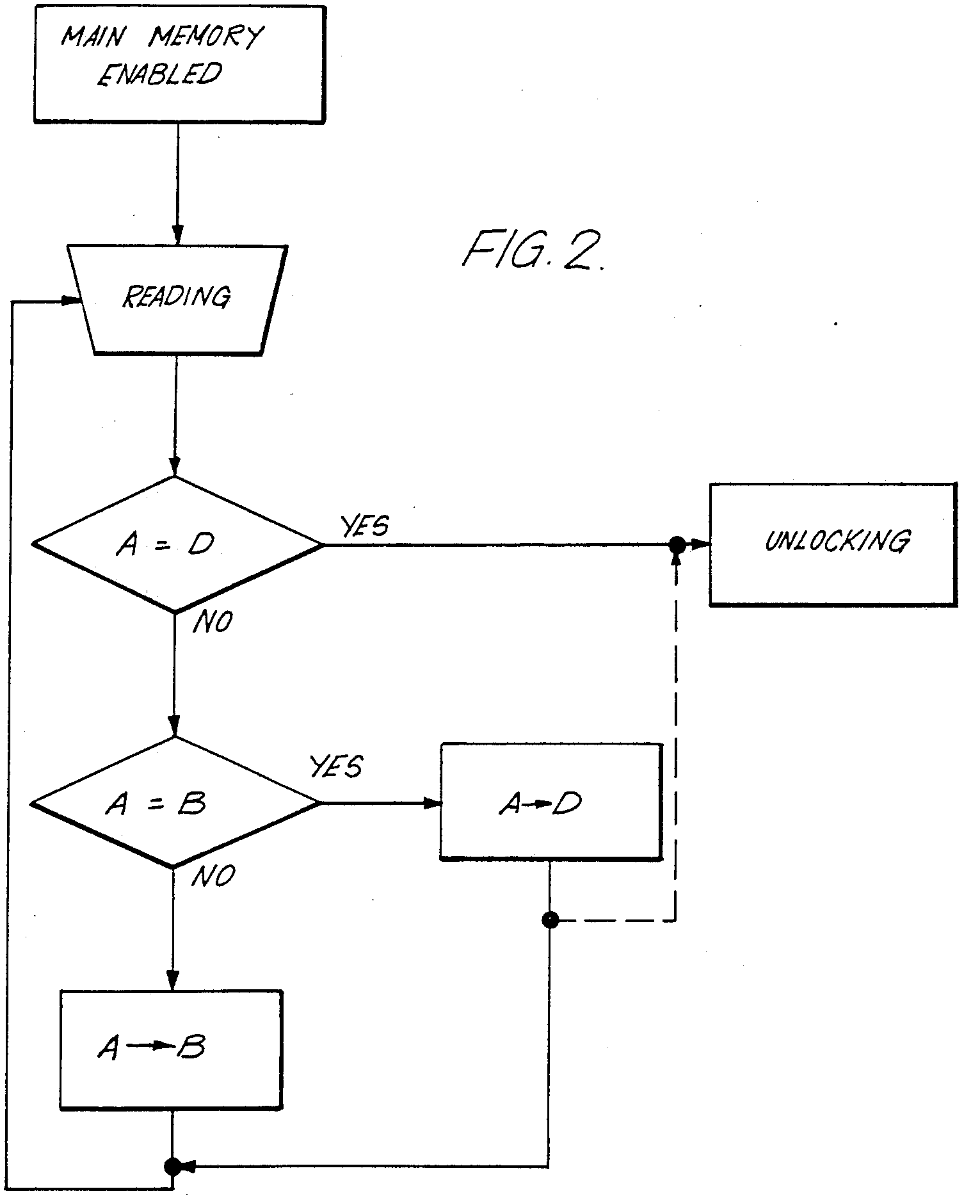
FIG. 2 is a flowchart of the key code setting operation for that device of FIG. 1.

The device includes a card reader 1 for reading the code from a card having a code encoded on a magnetic strip on the card. Most credit and charge cards have such a strip and are well known. A first auxiliary memory 2 is provided for storing the code read by the card reader 1. The device has a second auxiliary memory 3 and a main memory 4 for storing the unlocking codes. A display 5 will indicate if the contents of the first auxiliary memory 2 have been stored in the main memory 4. A microprocessor (CPU) 6 is provided for processing signals and controlling an unlocking circuit 7 for executing unlocking according to the unlocking signal given by the CPU 6. A multiposition switch 8 is available for manual selection of the operation mode of the CPU 6 according to the following positions:

0 . . . Normal operation mode of the electronic locking device
1 . . . Global master key setting position;
2 . . . First floor master key setting position;
3 . . . Second floor master key setting position;
4 . . . First area master key setting position;
5 . . . Second area master key setting position;
6 . . . Third area master key setting position;
7 . . . First maid key setting position;
8 . . . Second maid key setting position;
A . . . Emergency key setting position;
B . . . Test key setting position;
C . . . Double-lock/unlock key setting position;
D . . . First clearing key setting position;
E . . . Second clearing key setting position;
F . . . Third clearing key setting position Of these switch positions, the "0" position is the normal operation mode of the electronic locking device in which the locking device will be opened when the code of a magnetic card read by the card reader 1 agrees with a code set in the main memory 4, and setting of guest key codes is also made in this switch position. The position from "1" to "F" are for setting keys to be kept by hotel employees of the respective positions. Setting of codes for the employees keys can be effected by setting the multiposition switch 8 in the respective positions allocated to the respective keys, and inserting each key, a magnetic card, in the card reader 1 at least twice till, for example, the display 5 is lit up by the operation of the CPU 6 as shown by the flowchart in FIG. 2.

Of these keys for employees, the keys of "1" to "C" can unlock the locking devices at their respective levels by first setting their codes as shown above, setting the multiposition switch 8 in the "0" position, and inserting the key card into the card reader.

Figure 3:
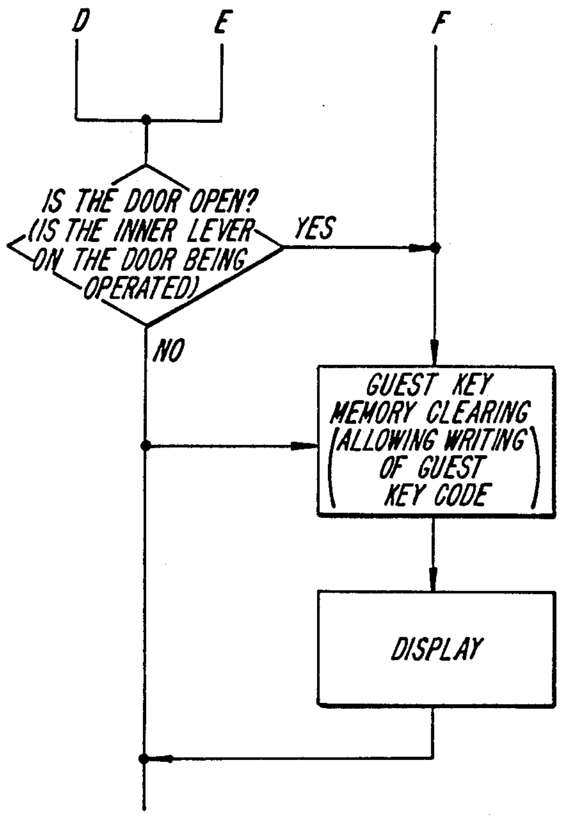
FIG. 3 is a flowchart showing one example of unlocking key code clearing operation in one preferred embodiment of the present invention.

The first, second and third clearing keys to be set in the switch positions D, E and F respectively enable the main memory to store a code or codes of a guest key or keys or clear the storage areas of the main memory 4 for setting a code or codes of a guest key or keys in the normal operation mode (switch position: "0") of the electronic locking device when the door is open (when the inner lever on the door is operated), when the door is closed, and when the door is either open or closed, respectively. When a key card set in one of these switch positions is inserted into the card reader 1 in the normal operation mode of the electronic locking device, according to, for example, the operation procedure of the flowchart of FIG. 3, the CPU 6 will clear the guest key code or codes in the main memory 4, and the code of a magnetic card to be inserted in the card reader 1 in this mode will be stored in the main memory 4 as an unlocking code (unlocking key code) of the guest key. Once a guest key or keys is set in the aforementioned manner, the CPU 6 will not allow setting codes of any magnetic cards as unlocking codes unless one of the clearing key card is inserted into the card reader 1 according to the position (open or closed) of the door. It is possible to arrange the electronic locking device so that after setting a guest key code or codes as shown above, if the door is not opened at least once within the specified time span, the code of the first card to be inserted into the card reader 1 after the elapse of the time span is set as an unlocking key code.

As described so far, this invention makes the use of the electronic locking device easier while retaining its safety.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. A method for clearing unlocking key codes in an electronic locking device for use with a door that is operable between an open and a closed position, the locking device being of the type that includes a central processing unit that stores first and second unlocking key codes, the locking device actuating when a code carried by a card is identical with an unlocking key code set in the central processing unit, the method comprising:

- providing a first clearing card carrying a first code, for clearing unlocking key codes only when the door is in the open position;
- providing a second clearing card carrying a second code, for clearing unlocking key codes only when the door is in the closed position;
- determining whether the door is in the open or closed position;
- comparing the code carried by one of the first and second clearing cards with the first and second unlocking key codes in the central processing unit;
- clearing the unlocking key codes if the door is in the open position and the code carried by the one clearing card is identical to the first unlocking key code set in the central processing unit; and
- clearing the unlocking key codes if the door is in the closed position and the code carried by the one clearing card is identical to the second unlocking key code set in the central processing unit.

2. The method of claim 1, wherein each step of providing includes providing a clearing card having a magnetic strip for carrying a code.

3. A method for setting and clearing unlocking key codes in an electronic locking device for use with a door that is operable between an open and a closed position, the locking device being of the type that includes a central processing unit capable of storing unlocking key codes, the locking device actuating when a code carried by a card is identical with an unlocking key code set in the central processing unit, the method comprising:

- providing a first clearing card carrying a first code, for clearing unlocking key codes only when the door is in the open position;
- setting a first unlocking key code in the central processing unit;
- providing a second clearing card carrying a second code, for clearing unlocking key codes only when the door is in the closed position;
- setting a second unlocking key code in the central processing unit;
- determining whether the door is in the open or closed position;
- comparing the code carried by one of the first and second clearing cards with the first and second unlocking key codes set in the central processing unit;
- clearing the unlocking key codes if the door is in the open position and the code carried by the one clearing card is identical to the first code set in the central processing unit; and
- clearing the unlocking key codes if the door is in the closed position and the code carried by the one clearing card is identical to the second code set in the central processing unit.

4. The method of claim 3, wherein each setting step includes setting an unlocking key code in a separate address in the central processing unit.

5. The method of claim 3, wherein each setting step is performed when the central processing unit is in a setting mode.

6. The method of claim 3, wherein the steps of determining, comparing and clearing are performed when the central processing unit is in an operational mode.

7. The method of claim 3, wherein each step of providing includes providing a clearing card having a magnetic strip for carrying a code.

8. A method for setting and clearing unlocking key codes in an electronic locking device for use with a door that is operable between an open and a closed position, the locking device being of the type that includes a multimode central processing unit capable of storing unlocking key codes, the locking device actuating when a code carried by a card is identical with an unlocking key code set in the central processing unit, the method comprising:

- providing a first clearing card carrying a first code, for clearing unlocking key codes only when the door is in the open position;
- setting a first unlocking key code in a first address of the central processing unit when the central processing unit is in a setting mode;
- providing a second clearing card carrying a second code, for clearing unlocking key codes only when the door is in the closed position;

setting a second unlocking key code in a second address of the central processing unit when the central processing unit is in a setting mode;

determining, when the central processing unit is in an operational mode, whether the door is in the open or closed position;

comparing, when the central processing unit is in the operational mode, the code carried by one of the first and second clearing cards with the first and second unlocking key codes set in the central processing unit;

clearing, when the central processing unit is in the operational mode, the unlocking key codes if the door is in the open position and the code carried by the one clearing card is identical to the first unlocking key code set in the central processing unit; and clearing, when the central processing unit is in the operational mode, the unlocking key codes if the door is in the closed position and the code carried by the one clearing card is identical to the second unlocking key code set in the central processing unit.

9. The method of claim 8, wherein each step of providing includes providing a clearing card having a magnetic strip for carrying a code.

* * * * *